March 17, 1959   E. PARKER ET AL   2,878,379
PULSE RADAR RECEIVERS
Filed Oct. 29, 1956

2,878,379
PULSE RADAR RECEIVERS

Eric Parker and David Lane Thomas, London, England, assignors to The Decca Record Company Limited, London, England, a British company Application October 29, 1956, Serial No. 619,032

2 Claims. (Cl. 250—20)

This invention relates to pulse radar receivers.

According to this invention, in a pulse radar receiver of the superheterodyne type, the amplitude-frequency response characteristic of an intermediate frequency stage is arranged so that, in the part of the frequency spectrum adjacent the intermediate carrier frequency, the response increases as the frequency becomes more remote from the carrier frequency. By intermediate carrier frequency is meant the frequency, in the intermediate frequency band, to which the radio carrier frequency has become transposed. By a suitable choice of the amplitude-frequency response characteristic in this manner it is possible to obtain an output, after demodulation, which is similar to the "differentiation" of a video waveform resulting from the use of a capacitance-resistance or resistance-inductance network having a time-constant substantially less than the duration of the transmitted pulse. As is well known, differentiation of the video signals in this way in a pulse radar receiver will, in general, break up or reduce long duration echoes and thus will help to reduce ground clutter. The present invention not only enables similar results to be obtained but also may considerably reduce the requirements as to the power and peak voltage to be handled in the intermediate frequency and video amplifier stages of the receiver.

In general, if the intermediate frequency stage is arranged to have a low gain in the part of the spectrum immediately adjacent the intermediate carrier frequency, signals of exactly the intermediate carrier frequency will almost necessarily be greatly attenuated and, for this reason, it will generally be necessary to add, to the output of the intermediate frequency stage before demodulation, a signal of exactly the intermediate carrier frequency in appropriate phase relation to the other intermediate frequency signals.

The required form of response characteristic of the intermediate frequency stage may be calculated mathematically and it is possible, as will be shown later, to determine the ideal characteristic to obtain a substantially exact equivalent of differentiation of the video waveform. For practical purposes, however, it may not be necessary to achieve this ideal response characteristic exactly, and it will be appreciated that the radar receiver will work even if the response characteristic diverges noticeably from the ideal.

To obtain a result closely approaching the equivalent of video differentiation, the response characteristic is preferably such that the response increases as the frequency becomes more remote from the carrier for a frequency range at least equal to the reciprocal of the pulse rise-time duration that is to say the duration of the required "differentiated" signal and it is desirable for this frequency range to be slightly greater than this, for example, approaching 1½ times the reciprocal of the pulse rise-time duration. It will be appreciated that the first side band of the Fourier series (if the signals of the intermediate frequency band are considered as a series of side bands) will be at a frequency displaced from the intermediate carrier frequency by an amount equal to the pulse recurrence frequency. It is therefore only necessary that the response characteristic should have the slope mentioned above in the region extending outwards from this first side band.

It will be generally preferable to utilise the side bands on both sides of the carrier frequency and in that case the intermediate frequency response characteristic is made such that, on both sides of the carrier frequency, the response increases as the frequency becomes more remote from the carrier frequency.

It may be shown theoretically that the ideal slope of the frequency response characteristic is a linear slope of 6 db per octave of the modulation frequency, that is to say, a 6 db increase in gain each time the harmonic number of the sideband is doubled.

It will be appreciated that the correct phase relationship between the individual side bands must be preserved and it may be shown that the requirements in this respect are that any phase shifts of the signals should be equivalent to a constant time delay for all the signals.

One method of obtaining the required intermediate frequency response characteristic is to use a narrow band amplifier which is tuned to a frequency away from the intermediate carrier frequency by an amount greater than the reciprocal of the pulse rise-time duration, the frequency response characteristic of the amplifier being made such that one flank of the amplifier response characteristic provides the required slope of the overall intermediate frequency stage characteristic. Although it is not necessary to utilise the signals on both sides of the intermediate carrier frequency, greater noise protection is obtained if this is done. For this purpose, two such amplifiers may be used, tuned to frequencies on opposite sides of the intermediate carrier frequency. The use of two separate amplifiers avoids the phase difficulties which may be encountered in attempting to use a double-tuned amplifier. The use of two amplifiers with response characteristics as described above will attenuate the intermediate carrier frequency and, to provide the required output at this frequency, a further sharply-tuned amplifier may be provided tuned to the intermediate carrier frequency, the output of which is combined with the output of said narrow band amplifier or amplifiers to increase the level of the carrier with respect to the side bands.

In order to explain the invention further, the mathematical basis of it will now be briefly outlined. The Fourier waveform of a recurrent pulse signal in the form of a modulated carrier with 100% modulation may be written as:

$$k_1 A_{av} \sin \omega_c t \left\{ 1 + 2 \sum \left( \frac{\sin \frac{\pi n F}{f_0}}{\frac{\pi n F}{f_0}} \right) \sin (2\pi n F t) \right\} \quad (1)$$

where $k_1$ is an arbitrary constant.

$A_{av}$ is the average value of a waveform $\frac{1}{T}\int_0^T y(t)dt$ $F$ is the pulse recurrence frequency.

$f_0 = \frac{1}{T_0}$ is the reciprocal of the pulse rise-time duration.

$T = \frac{1}{F}$ $y(t)$ is the waveform function representing the modulation envelope $\omega_c$ is $2\pi$ times the carrier frequency, and $n = 0, 1, 2$ etc. for the various components.

The received radar signal may be considered as a linear super-position of a number of such waveforms with different time delays and different amplitudes. It will therefore, in the linear case, be sufficient to consider only one such waveform.

It is known that the differential of a Fourier series $$\tfrac{1}{2}A_0 + \sum A_n \sin{(nt)}$$

where $A_0, A_1, A_2 \ldots A_n \ldots$ are constants is $$\sum nA_n \sin{(nt)}$$

In the present case, if the video signals is to be equivalent to a differentiated signal, it should have the form:

$$\sum A_{av} \frac{\sin \frac{\pi n F}{f_0}}{\frac{\pi F}{f_0}} \sin{(2\pi n F t)} \qquad (2)$$

At the intermediate frequency, where this signal is modulating a carrier, the signal would have to be:

$$\sin \omega_c t \left\{ 1 + k \left[ 2\sum A_{av} \frac{\sin \frac{\pi n F}{f_0}}{\frac{\pi F}{f_0}} \sin{(2\pi n F t)} \right] \right\} \qquad (3)$$

where $\omega_c$ in this case is $2\pi$ times the intermediate carrier frequency,
$k$ is a constant defined by $kV_p \leqslant 1$, and
$V_p$ is the peak voltage of the differentiated waveform.

Before differentiation, the ratio of carrier to first side band was unity but, after differentiation, it is $$\frac{1}{kA_{av}} \geqslant \frac{V_p}{A_{av}}$$

This shows that the better the differentiation, the higher must be the ratio of carrier to first side band and this explains why it will, in general, be necessary to add signals of the intermediate carrier frequency before demodulation. If the equivalent of video differentiation is to be obtained, the carrier must be supplied if necessary to make the ratio of the carrier amplitude to the first side band amplitude at least equal to the ratio of peak volts to average volts of the differentiated signal. This may be explained in another way from consideration that a differentiated video signal derived from a rectangular pulse signal consists of positive and negative impulses of equal amplitude, one at the beginning and one at the end of the undifferentiated pulse. If the differentiated signal is to be a modulation signal on a carrier, then the carrier amplitude must be at least equal to the amplitude of the impulses.

Considering the signals on only one side of the intermediate carrier frequency, these signals have a spectrum:

$$\sum \frac{\sin \frac{\pi n F}{f_0}}{\frac{\pi F}{f_0}} \cos{[(\omega_c + 2\pi n F)t]} \qquad (4)$$

Comparing this expression with the corresponding expression to be derived from (3) above, it will immediately be apparent that, to produce the equivalent of video differentiation, the intermediate frequency stage must have a response characteristic giving an attenuation of 6 db per octave. As is well known, in a conventional pulse radar receiver in which it is desired to make the video waveform correspond as closely as possible to the modulation of the received radio frequency signals, the intermediate frequency stage must have a bandwidth as wide as possible but there are practical limits of bandwidth beyond which little further advantage is gained. Similarly in the receiver of the present invention, al-through ideally, to produce the equivalent of video differentiation, the intermediate frequency stage response characteristic should have the above-mentioned slope of 6 db per octave for as wide a band as possible there are practical limits and, for most purposes it would be sufficient if the bandwidth extends on either side of the intermediate carrier frequency over frequency ranges equal to one or preferably one and a half times the reciprocal of the pulse rise-time duration.

The following is a description of one embodiment of the invention, reference being made to the accompanying drawings in which.

Figure 1:
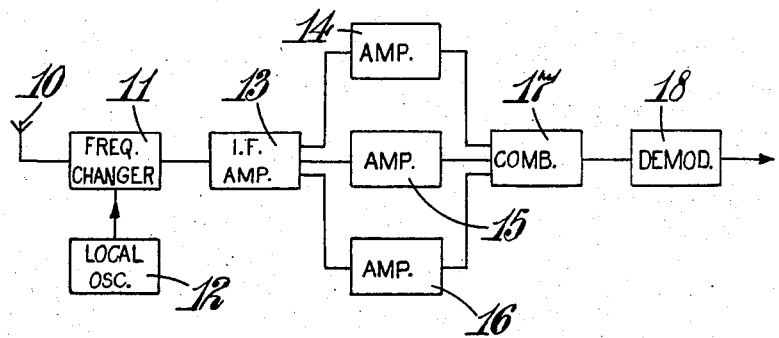
Figure 1 is a block diagram showing part of a pulse radar receiver.

Referring to Figure 1, there is shown diagrammatically a pulse radar receiver having an aerial 10 for feeding received signals into a frequency changer circuit 11 where they are mixed with the output from a local oscillator 12 to produce intermediate frequency signals which are amplified by a broad band intermediate frequency amplifier 13. The output from the amplifier 13 is fed into three separate amplifiers 14, 15 and 16, and the outputs of these three amplifiers are combined in a combining unit 17 and then fed to a demodulator 18 for producing a video frequency output.

Figure 2:
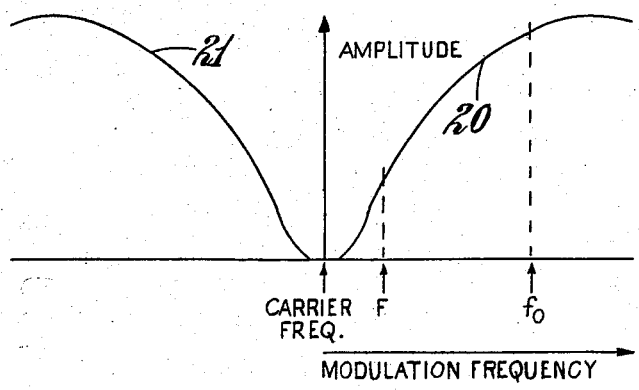
Figure 2 is a graphical diagram for explanatory purposes.

The amplifier 14 is tuned to one side of the carrier frequency so as to have an amplitude-frequency response characteristic such that the amplitude increases as the frequency becomes more remote from the intermediate carrier frequency, that is to say, as the modulation frequency increases. This amplitude frequency response characteristic is shown diagrammatically by the curve 20 in Figure 2 which is a graphical diagram (not to scale) showing the relationship between amplitude and modulation frequency. As seen in Figure 2, the curve 20 decreases substantially to zero at the carrier frequency but the form of the curve between the carrier frequency and the first side band frequency F is not of importance, F, as previously defined, being the pulse recurrence frequency. For modulation frequencies beyond F, the characteristic is preferably such that the amplitude increases at the rate of 6 db per octave for at least as far as a frequency $f_0$ ($f_0$ as previously defined being the reciprocal of the pulse rise-time duration) and preferably for about 1½ times this frequency. Such a linear characteristic would be shown as a straight line if the curve 20 were plotted with a logarithmic scale of amplitude and a logarithmic scale of modulation frequency. It will be appreciated however that, in practice $f_0$ is many times greater than F, for example many thousand times greater and that Figure 2 is, for clarity, not to scale.

The amplifier 16 is tuned to opposite side of the carrier frequency compared with amplifier 14 and has a response characteristic as shown by the curve 21 in Figure 2 which is substantially similar to the curve 20, but on the opposite side of the carrier frequency.

The amplifier 15 is sharply tuned to the carrier frequency, that is to say its output consists predominantly of the carrier frequency with negligible side band components.

Although the optimum form of the characteristics of the various amplifiers has been more particularly described, it will readily be apparent that substantial advantages will be gained even when the response characteristic differs substantially from the optimum and, for example, instead of using two amplifiers 14 and 16 tuned on the opposite sides of the intermediate carrier frequency, it may be preferred in some cases to use a single double tuned amplifier. It will be particularly noted that the response increases as the modulation frequency increases in contrast to conventional types of intermediate frequency amplifiers in which the amplitude decreases as the modulation frequency increases.

We claim:

1. In pulse radar apparatus utilizing regularly repetitive radiated pulses of a predetermined duration and of a given radio frequency and having a receiver of the superheterodyne type; an intermediate frequency stage comprising a sharply tuned amplifier tuned to the intermediate frequency corresponding to said given radio frequency, a pair of narrow band amplifiers, and means for combining the outputs of said narrow band amplifier and said sharply tuned amplifier, said pair of narrow band amplifiers being tuned to frequencies away from and on opposite sides of the intermediate frequency corresponding to said given radio frequency by an amount greater than the reciprocal of the pulse duration, the frequency response characteristic of the narrow band amplifiers being such that one flank of each of the narrow band amplifier characteristics gives the intermediate frequency stage an overall characteristic such that the response increases at a rate of substantially 6 db per octave of the modulation frequency as the frequency becomes more remote from a frequency displaced, on the side to which the narrow band amplifier is tuned, from the intermediate frequency corresponding to said given radio frequency by an amount equal to the pulse repetition frequency.

2. In pulse radar apparatus, an intermediate frequency amplifier stage as claimed in claim 1 and arranged so that any phase shifts introduced are linearly proportional to the frequency.

References Cited in the file of this patent

UNITED STATES PATENTS

| | | |
|---|---|---|
| Re. 19,668 | Van Roberts | Aug. 13, 1935 |
| 1,733,414 | Knapp | Oct. 29, 1929 |
| 1,904,605 | Barden | Apr. 18, 1933 |
| 2,205,365 | Schwaen | July 18, 1940 |

FOREIGN PATENTS

| | | |
|---|---|---|
| 728,773 | Germany | Dec. 3, 1942 |